(No Model.) 2 Sheets—Sheet 1.

W. J. LLOYD.
TRICYCLE.

No. 295,257. Patented Mar. 18, 1884.

Witnesses
C. W. Brown.
Philip Hawley.

Inventor
Walter John Lloyd
Per Wallace A. Bartlett.
His attorney.

(No Model.) 2 Sheets—Sheet 2.

W. J. LLOYD.
TRICYCLE.

No. 295,257. Patented Mar. 18, 1884.

Witnesses
C. H. Brown
Philip Hawley

Inventor
Walter John Lloyd
Per Wallace H. Bartlett
His attorney.

UNITED STATES PATENT OFFICE.

WALTER JOHN LLOYD, OF HARBORNE, BIRMINGHAM, COUNTY OF STAFFORD, ENGLAND.

TRICYCLE.

SPECIFICATION forming part of Letters Patent No. 295,257, dated March 18, 1884.

Application filed January 2, 1884. (No model.) Patented in England August 31, 1882, No. 4,157.

*To all whom it may concern:*

Be it known that I, WALTER JOHN LLOYD, a subject of the Queen of Great Britain, residing at Harborne, Birmingham, in the county of Stafford, England, have invented certain new and useful Improvements in Tricycles, of which the following is a specification, reference being had therein to the accompanying drawings.

This invention relates to tricyles; and it consists in certain improvements in the steering apparatus of tricycles and similar vehicles, as hereinafter pointed out and claimed.

The object of the invention is to facilitate the motion of a tricycle in a curve by the mechanism hereinafter described, or the mechanical equivalent thereof.

Figure 1:
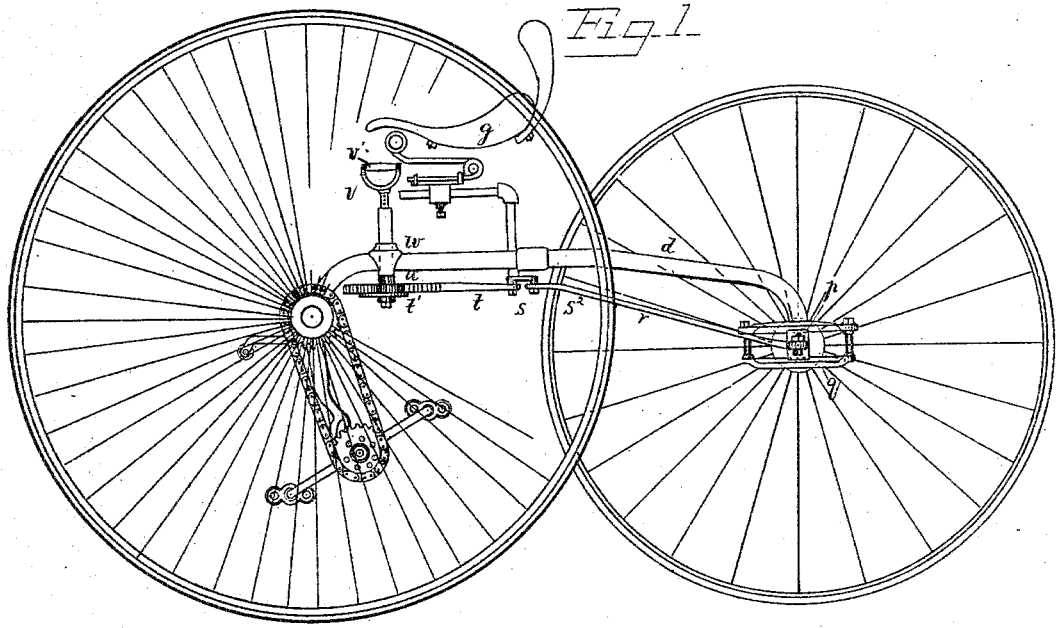
Figure 2:
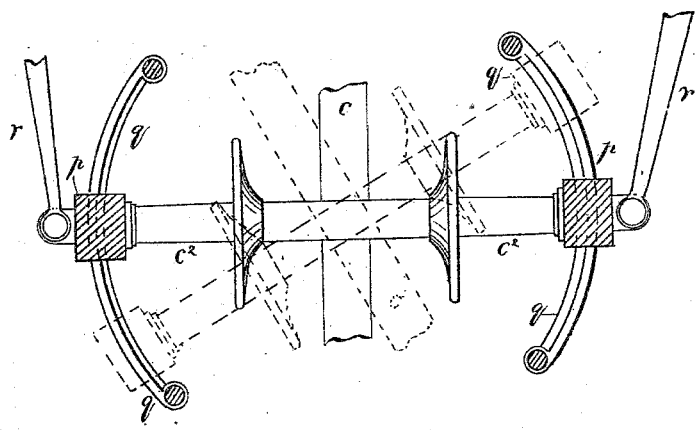
Figure 2:
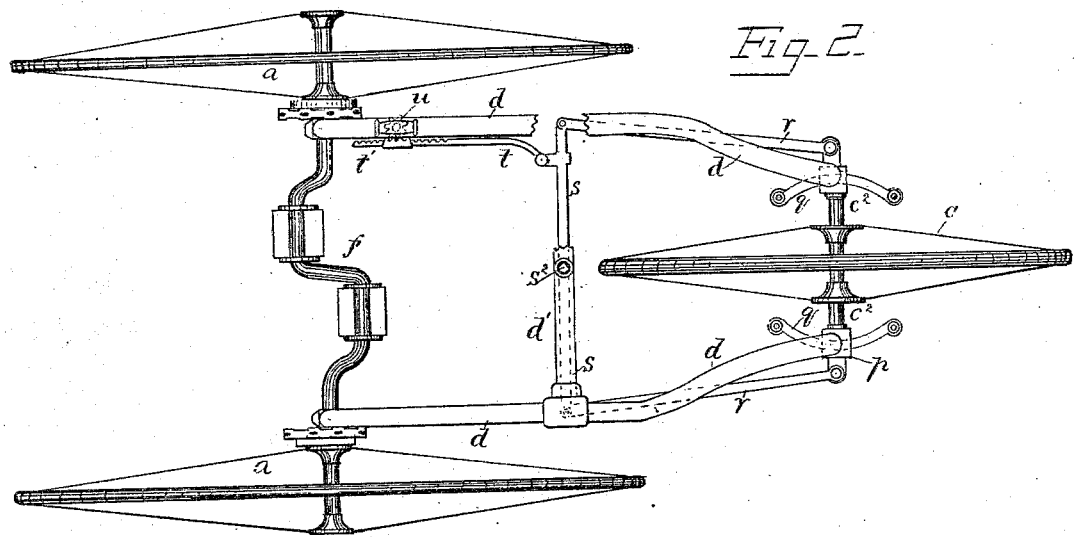
Figure 4:
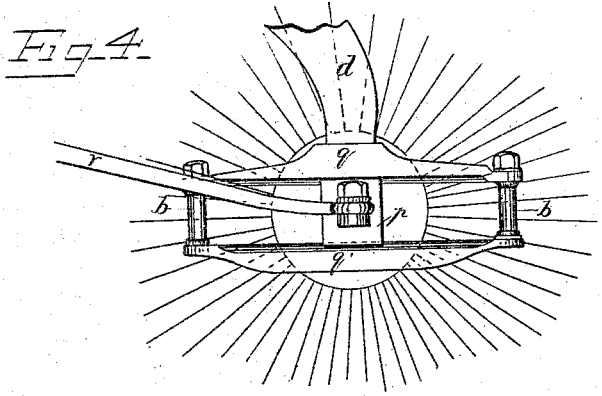
Figure 5:
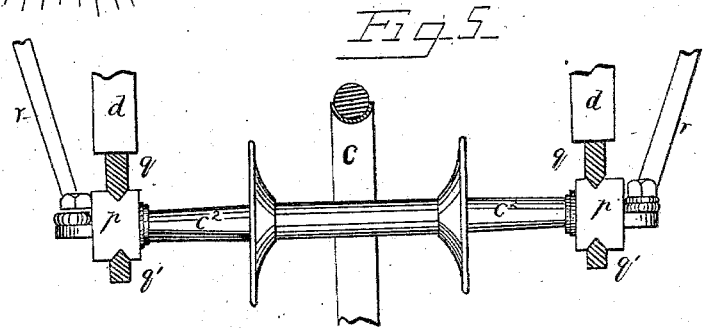

In the drawings, Figure 1 is a side elevation of a tricycle embodying this invention, parts being omitted which are unnecessary to the illustration thereof; and Fig. 2, a plan thereof. Fig. 3 is a plan view, partly in section, of part of the steering mechanism on an enlarged scale. Fig. 4 is a side elevation of one of the sliding bearings and its auxiliaries; and Fig. 5 is a rear elevation, partly in section, of the steering device.

The driving or traction wheels $a$ $a$ are not fixed to the driving-shaft, but are capable of separate rotation thereon. These wheels may be driven in any usual manner, so that both wheels are driven by the shaft when the vehicle moves in a straight line; but when moving in a curve the motion of the shaft is communicated to only one of the traction-wheels, the other traction-wheel moving at the rate required by the curve on which the tricycle travels. The hind or steering wheel $c$ is made, preferably, of large diameter, and the wheel is fixed to the horizontal axle $c^2$, which projects some distance on each side of the steering-wheel. The ends of the axle $c^2$ are supported and turn in bearings $p$ $p$, which bearings are supported by and made capable of sliding in the curved plates or guideways $q$ $q'$. These plates are shown as secured together, one above and the other below the sliding bearings, by bolts $b$ $b$, or in other suitable manner; but by the use of a different bearing-block one plate, $q$, at each side of the wheel may be sufficient. The plates $q$ are a part of or firmly attached to frame $d$, and have their concave sides toward each other, the curve being struck from the middle of the axis of the hind wheel. As represented, the bearing-blocks $p$ $p$ have notches in their upper and lower surfaces, which notches embrace ribs or projections on the inner faces of the curved plates $q$ $q'$. Anti-friction devices may be introduced between the bearing-surfaces. Connecting-rods $r$, attached to each of the bearing-blocks $p$, lead to the ends of lever $s$. This lever $s$ is centrally pivoted at $s'$ to a cross-bar, $d'$, of the frame $d$. When the lever $s$ is rocked on its center, one of the rods $r$ is drawn forward and the other forced backward, moving the bearings $p$ $p$ with them in the curved plates $q$ $q$, thus drawing one end of the axle $c^2$ forward and forcing the other back, to give the desired direction to the steering-wheel $c$. The lever $s$ is operated by means of a draw-bar, $t$, pivoted to one end thereof, as shown, and extending forward from said pivot. The front portion of said draw-bar is provided with a rack, $t'$, and the bar is held in position near the frame $d$ by suitable supports. A pinion, $u$, which engages the rack $t'$, is mounted on the steering-rod $v$, which is supported in a suitable bearing, as at $w$, on frame $d$. The turning of handle $v'$ thus serves to rotate the pinion $u$, and by this means slide the draw-bar, and through its connecting mechanism incline the steering-wheel.

It is evident that a similar arrangement of draw-bar and handle may be made at each side of the vehicle, if desired; also that the same arrangement of devices may be adapted to a tricycle which has its steering-wheel in front.

The construction and arrangement of the driving-axle $f$ and its driving-gear, as well as that of saddle $g$, are not herein claimed.

By the arrangement of steering-gear described the usual vertical fork which supports the steering-wheel is dispensed with, the frame is made broader, and its strength and stability increased.

I claim—

1. In a tricycle, the steering-wheel having an elongated axle and bearings near the ends thereof, as described, in combination with the frame $d$, having two curved guide-bars at each end thereof, said guide-bars arranged to embrace the sliding bearings, as described, and connected at the ends by screw-bolts, substantially as shown and set forth.

2. The combination of the steering-rod and its pinion, a draw-bar with which said pinion engages, a lever operated by said draw-bar, and suitable connections, substantially as described, from the ends of said lever to the bearings of the steering-wheel axle, said bearings being adapted to move in curved guideways, all substantially as described.

3. The steering-wheel having elongated axle $c^2$, the bearings $p$ of said axle having side grooves, and the curved guides $q\,q'$, having edge projections, which extend into said grooves, all arranged and combined to operate substantially as shown and set forth.

In testimony whereof I affix my signature in presence of two witnesses.

WALTER JOHN LLOYD.

Witnesses:
WILLIAM PRIEST,
H. G. PRIEST.